Jan. 8, 1963

H. J. MacKAY 3,071,885

FISHING LURE STORAGE FACILITIES

Filed Nov. 17, 1960

INVENTOR.
Hugh J. MacKay,
BY

Attorneys.

INVENTOR.
Hugh J. MacKay,
BY

Attorneys.

United States Patent Office 3,071,885
Patented Jan. 8, 1963

3,071,885
FISHING LURE STORAGE FACILITIES
Hugh J. MacKay, 1411 N. Bradley Road,
Lake Forest, Ill.
Filed Nov. 17, 1960, Ser. No. 69,903
1 Claim. (Cl. 43—57.5)

The present invention is directed to apparatus and facilities for storing artificial fishing lures, such as are exemplified by the many and varied types of flies used in fly fishing.

In fly fishing it is highly desirable to enable the fisherman to conveniently carry a large number of lures and at the same time allow convenient and readily accessible use of the lures. Accordingly, the primary object of the present invention is to form a lure receptacle that enables the fisherman to have convenient use and access to a wide variety of fly lures, while at the same time enabling a compact assembly. A related purpose of the invention is to provide improved means for enabling the fisherman to quickly store and retrieve a wide variety of fishing lures used in the fishing process.

Other objects and purposes will appear from time to time in the course of ensuing specification and claim, and with reference to the accompanying drawings in which:

Like elements are designated by like character throughout the specification and drawings.

Figure 1:
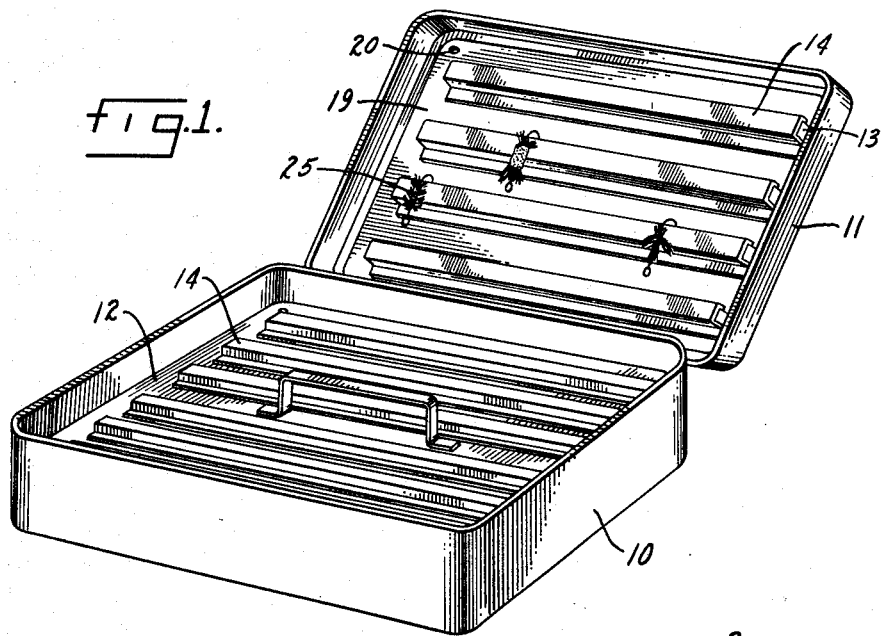
FIGURE 1 is a perspective view of a fishing lure receptacle embodying the principles of the present invention.

With particular reference now to the drawings and in the first instance to FIGURE 1, 10 designates the lower half of a fishing lure and tackle box. An upper cover 11 may be hinged to the lower half 10 in conventional fashion, so as to enable the elements 10 and 11 to be closed one upon the other and secured through any suitable or conventional fastening devices. It should be understood that the receptacle defined by the base 10 and cover 11 may be provided with any suitable facilities for attaching the same to the belt or clothing of the fisherman.

Figure 2:
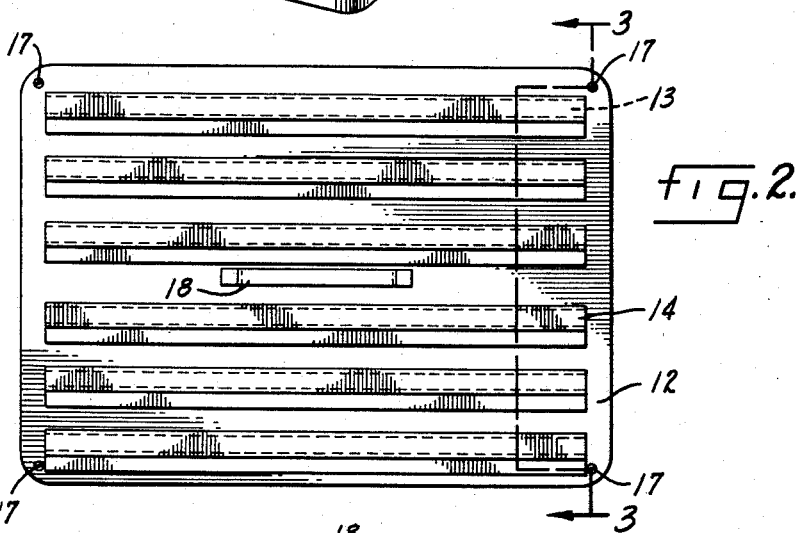
FIGURE 2 is a plan view of one of the elements illustrated in FIGURE 1.
Figure 3:
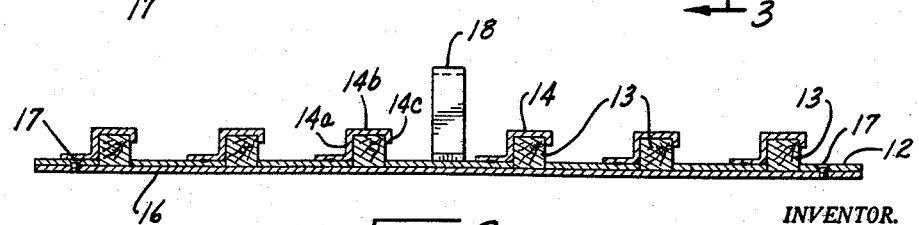
FIGURE 3 is an end view of the element illustrated in FIGURE 2 and taken along the section lines 3—3 of FIGURE 2 so as to illustrate the manner in which the several elements of the sub-assembly illustrated in FIGURE 2 are formed.

In accordance with the present invention, the fly lures are adapted to be stored on plates 12 which may be disposed within the receptacle defined by the base 10 and cover 11. Such a plate is particularly illustrated in FIGURES 2 and 3. In FIGURES 2 and 3, for example, the plate is shown as supporting a plurality of elongated and generally parallel wood-like strips 13. It should be understood that as used herein, the term "wood-like" is intended to designate actual wood, as for example balsa wood, cork strips, or other material capable of receiving the barbed ends of fish hooks and holding them in position on the plate 12. In order to hold the elongated strips 13 in position on the supporting plate 12, the plate 12 has a plurality of elongated recesses formed therein and of a size corresponding approximately to the cross-sectional width dimension of the strips 13, which, as illustrated in the drawings, are generally square in cross section. The material from the plate is stamped to define the recess on which the elements 13 are seated. Metal strips 14 are spot welded to the upper surface of plate 12 alongside each recess. These strips 13 are bent to provide upstanding portions 14a, top portions 14b overlying the strips 13, and downwardly extending hook portions 14c, which extend downwardly through a portion of the height of the strips so as to leave a portion of the side of the strip exposed, while confining the strips within the recesses. A backing plate 16 has a size and configuration corresponding to the plate 12 and is positioned in surface-to-surface contact therewith, so that the strips 13 rest upon the upper surface of the backing plate 16. The backing plate 16 may be secured to the plate 12 through any suitable fastening means, such as screws 17, thus allowing disassembly of the plate 12 and the backing plate 16.

An upstanding handle 18 may be soldered or otherwise fixed to the upper surface of the plate so as to enable the user thereof to conveniently lift the same from the base 10 of the receptacle.

A plate similar to the plate 12 with its elongated and generally parallel supporting strips is positioned in the cover 11 of the receptacle. This plate appears at 19 in FIGURE 1 and includes elongated strips secured to the plate 19 in the same fashion as that illustrated in FIGURES 2 and 3. It should be understood that the spacing of the strips on the plate 19 or on the cover plate, should be such as to prevent interference between the upstanding handle 18 and the strips proper. It is preferred that the handle 18 have a height such with relation to its position in the receptacle that the upper portion thereof will contact the surface of plate 19 when the cover 11 is in the closed position on the base 10. The plate 19 may be secured to the inside surface of the cover 11 by means of any suitable screws or the like 20.

Figure 4:
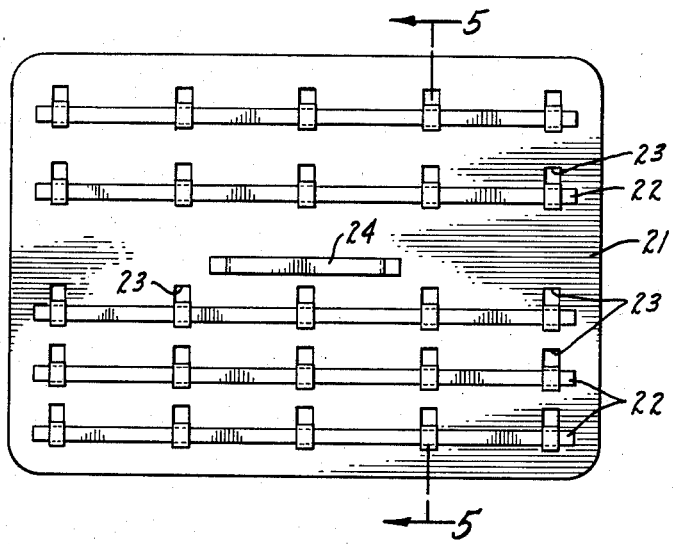
FIGURE 4 is a plan view of a modified form of the invention.
Figure 5:
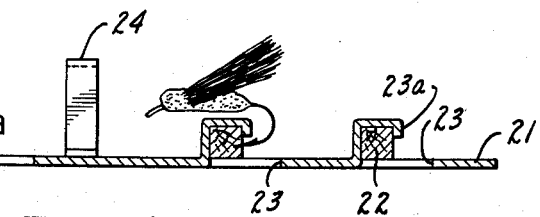
FIGURE 5 is an end view of the sub-assembly illustrated in FIGURE 4 and taken on the section lines 5—5 of FIGURE 4.

FIGURES 4 and 5 illustrate a modified form of the invention. In FIGURES 4 and 5 a single plate-like element 21 is used to support a plurality of elongated wood-like strips 22 which are disposed in generally parallel relation, as appears in FIGURE 4. In FIGURES 4 and 5 the plate-like element 21 has the material thereof stamped in the form of slots 23, which extend transversely to the strips 22 and have a length greater than the cross-sectional width of the strips 22. The material stamped from the slots is bent upwardly into upstanding relation to the plate and is then bent generally parallel to the surface of the plate. It terminates in a downwardly projecting hook portion, thereby enabling retention of the strips 22 within the confines of the hooks defined by these members, the strips 22 themselves resting upon the upper surfaces of the plates.

As in the form of the invention illustrated in FIGURES 1, 2 and 3, the plate 21 has a handle 24 fixed thereto to enable convenient lifting of the plate from the interior of the receptacle. It should be understood, of course, that plates formed in the manner of FIGURES 4 and 5 may also be secured to the inner surface of the cover 11.

In using the form of the invention illustrated in FIGURES 1, 2 and 3, the user simply inserts the wood-like strips into the elongated slots in the plate 12 in a position where the overlying portion of the members 14 are in contact with the strips. The backing plate 16 is then brought into contact with the lower surface of the plate 12 and secured thereto, thereby securing the strips 13 in position. The user of the receptacle may then position flies on the strips by simply inserting the hook portions thereof into the strips, as is generally designated by the flies 25 of FIGURE 1. When using the receptacle, the plate 12 may, of course, be lifted out to enable convenient access to the flies stored on the strips. It should be understood that the plate 12 may be positioned on and over a series of compartments positioned within the lower portion of the base 10, which compartments provide for storage of additional equipment such as, for example, additional lures, hooks, or other articles utilized in the fishing sport.

After the plates have been in use for some time, the user thereof may disassemble the plate 16 from the plate 12 and then rotate the strips 13 so as to present a new and undented side of the strips for engagement with the hooks of the lures.

The use of the form of the invention illustrated in FIGURES 4 and 5 is similar to that of FIGURES 1, 2 and 3. In using the form of the invention illustrated in these figures, the strips may be revolved through a quarter of a revolution by simply sliding them endwise from beneath the overlying hook portions of the material 23a, rotating the strips, and then reinserting them. In the forms of the invention illustrated in FIGURES 4 and 5, the strips are held in place by the frictional engagement between the hook-like portions 23a and the strips, the frictional engagement therebetween being sufficient to hold the strips tightly against the upper surface of the plate 21.

It should be understood that supporting plates as herein illustrated and described may be conveniently formed of metal, although the plates may also be formed from molded plastic, so as to present the characteristic upstanding and overlying hook portions which retain the wood-like strips in position on the supporting plate.

In each form of the invention, the strips may be spaced at varying distances from adjacent strips, thus properly accommodating large and small lures.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claim.

I claim:

A fishing lure receptacle including a base, and a cover hinged thereto and adapted to overlie and enclose the base, a plate-like element positioned within the receptacle defined by said base and cover, said plate-like element having a plurality of wood-like strips of square cross section disposed thereon in generally parallel fashion, the plate-like element having hook portions upstanding therefrom and overlying a plurality of sides of said wood-like strips while leaving at least one side of each strip exposed, said base having elongated slots corresponding generally to the length and width of said wood-like elements, said wood-like elements being disposed within said slots, said plate having a backup plate positioned against the underside thereof and removably secured thereto with the wood-like elements resting thereupon, the strips being removably positioned in said slots and held therein by the conjoint action of said hook portions and backup plate, said hook portions having depending lip portions overlying a portion of said exposed sides.

References Cited in the file of this patent

UNITED STATES PATENTS

| 1,577,566 | Cryder | Mar. 23, 1926 |
| 2,573,431 | Gibson | Oct. 30, 1951 |

FOREIGN PATENTS

| 489,055 | Great Britain | July 19, 1938 |